Jan. 8, 1929.
R. M. CRAIG
1,698,216
DISPLAY APPARATUS
Filed Aug. 14, 1925
3 Sheets-Sheet 1
Fig. 1.
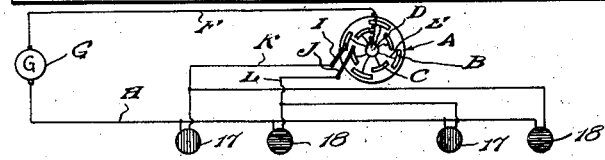
Fig. 2.
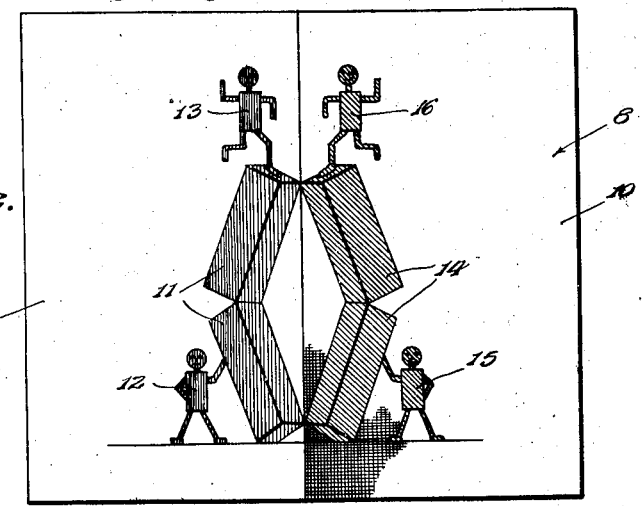
Inventor
R. M. Craig.
By Lacey Lacey, Attorney Jan. 8, 1929.

R. M. CRAIG 1,698,216

DISPLAY APPARATUS

Filed Aug. 14, 1925

Inventor
R. M. Craig.
By Lacey & Lacey, Attorneys

Jan. 8, 1929.  
R. M. CRAIG  
DISPLAY APPARATUS  
Filed Aug. 14, 1925  
1,698,216  
3 Sheets-Sheet 3
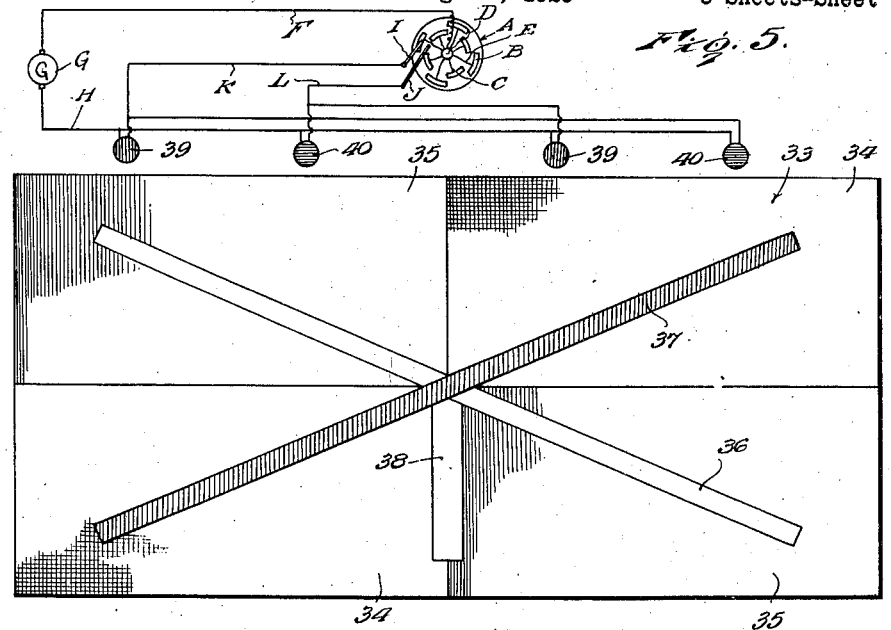
Fig. 5.
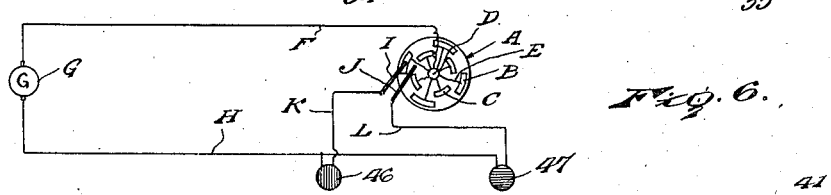
Fig. 6.
Inventor  
R. M. Craig.  
By Lacey & Lacey, Attorneys Patented Jan. 8, 1929.

1,698,216

UNITED STATES PATENT OFFICE.

RICHARD M. CRAIG, OF SAN ANTONIO, TEXAS.

DISPLAY APPARATUS.

Application filed August 14, 1925. Serial No. 50,330.

This invention relates to a novel method of and means for displaying advertising matter and the like in a manner to attract and hold the attention of the observer, and is designed as an improvement over the methods constituting the subject matter of my prior patents, namely, advertising sign, No. 1,276,494, issued August 20, 1918, and animated sign, No. 1,428,007, issued September 19, 1922.

As was pointed out in the specifications of my said prior patents, it is a well recognized fact that the controlling factors in determining the value of an advertising display sign as measured by its power to attract and hold the attention, are light, color and animation, as well as the factor of mystification, and where advertising matter is displayed in such a manner that all of these factors are present, the display will attract and hold the attention of the observer to a far greater degree than where one or more of these factors are not present. Attempts have been made to bring about these desirable results by the erection of huge signs on which images are displayed through a carefully selected arrangement of an enormous number of electric light bulbs of different colors, but the cost of such signs is prohibitive and they do not truly portray motion or change in appearance of the matter displayed. In accordance with my previously disclosed methods, figures are depicted, by the use of pigments, or dyes or inks of complementary colors, in superposed relation, upon a sign board or other display surface having a substantially white back ground, and this surface is alternately illuminated by special light rays of the corresponding complementary colors, so that if an image is portrayed in two different positions, as a simple example, one position being represented in red and the other in blue green, and the display surface is flooded with red light, the image in red will be invisible to the eye, and the image in blue green will appear substantially black, and, conversely, if the display surface is flooded with a blue green light, the blue green image will be invisible and the image in red will appear substantially black on a white background, so that, due to persistence of vision, the effect of animation is produced. In painting the images, under these methods it was found necessary to use what are termed transparent colors, due to the fact that the images more or less overlapped, the color last applied being transparent, and while, during night display, the sign would possess great value as an advertising medium, yet it was to some extent lacking in value as a daylight sign, due to the overlapping of the images. Furthermore, I have found that opaque pigments are more or less desirable, where they can be employed, as they enhance the value of the sign as a daylight sign. Furthermore, I have found that in the case of outdoor displays it is essential, from a practical and commercial point of view, that opaque pigments be employed which are not affected by the elements or sun rays so that, for example, fugitive pigments are wholly unsuitable for the purpose. Therefore, it is one of the objects of the present invention to disclose a method of and means for producing the effect of animation or change in position or condition of one or more displayed images, in such manner that the display surface will possess as great value as any ordinary daylight sign as well as an animated medium for display at night, and in this connection the invention contemplates the complete separation of the displayed images and their display to the observer in a more effective manner than is possible where they are overlapped.

It will be seen that in my prior patented methods, the different images or different positions of the images, or other different matters, were depicted in complementary colors on the display surface, and while, under the present method this is likewise contemplated, except that the images are in most instances completely separated or different matters to be displayed are completely separated, the present invention contemplates and has as another object the display of different matters or different images or different positions of the same images, in a single pigment color under spectral light rays of such colors as will effect the appearance of change or animation, thereby obviating the necessity of employing complementary colors upon the display surface, and this is of particular advantage where, for example, the advertising matter embraces a representation of a trade mark peculiar to the commodity being advertised and where an essential feature of the trade mark is a distinctive color throughout.

It has been found that where complementary pigment colors are employed in depicting images or different matters upon a light background, such for example as red and blue or green, difficulty is experienced at times, in completely obliterating the matter displayed in blue or green, whereas the matter displayed in red, orange or yellow can be readily completely obliterated under proper conditions of illumination of the white or light colored display surface. Therefore, it is another important object of the present invention to evolve a method whereby, where complementary colors are employed such as red and blue or blue green, or green, the matter displayed in the latter colors may be completely obliterated at the time the matter in red is displayed, and, in this connection, the invention further contemplates a medium whereby the matter displayed in blue, blue green, or green, will, under the conditions of display, be brought out with brilliancy to an extent which has been heretofore found impractical.

A further object of the invention is to evolve a method of display in which advantage is taken of the characteristics of colors for the background of the display surface in a manner to permit of a vast variety of combinations of pigment colors and a display thereof under selected spectral colors in a manner to produce novel display effects.

In the accompanying drawings:

Figure 1 is a schematic view illustrating one application of the principles of the present invention wherein different matters are depicted in a common pigment color on different neutral backgrounds and are displayed by different spectral colors to produce the effect of transformation.

Figure 2 is a similar view illustrating another application of the principles of the invention wherein the effect of animation is produced and wherein backgrounds of different neutral colors are employed.

Figure 5 is a similar view illustrating a further application of the principles of the invention in which the effect of animation is to be produced and wherein a portion of the display matter is common to two positions of another portion of the display matter.

Figure 6 is a schematic view illustrating still another application of the principles of the invention, wherein parts of represented images are overlapped and wherein the images are represented in complementary pigment colors on a neutral background.

Figure 3:
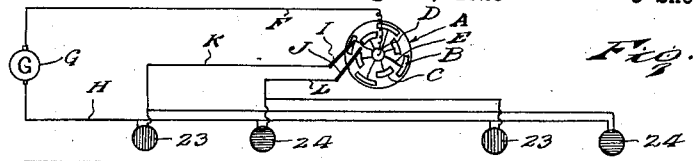
Figure 3 is a schematic view illustrating another application of the principles of the invention, wherein the effect of animation is to be produced and the displayed images are in different complementary pigment colors on a common neutral background and are to be displayed by complementary spectral colors.

In the description which is to follow, reference will be made to pigment colors and by this term is meant colored pigments or the colors in which the images are represented on the display surface. Where reference is made to spectral colors such reference applies to colors of the spectrum as represented by colored light rays. Reference will also be made to neutral colors, which I employ as backgrounds, and by neutral colors I mean such as do not materially change under the spectral colors by which the images are displayed or, in other words, those which display no decided color characteristics such as relate to primary colors, and remain of about the same apparent density under complementary or primary colored light rays.

In Figure 1 of the drawings, illustrating one application of the principles of the invention, the numeral 1 indicates in general a display surface which may be a signboard or any other surface found suitable for the purpose. In carrying out the invention, substantially one-half of the area of the board is painted to provide a neutral background 2 which is light in color and painted white lead or zinc white or any other appropriate light neutral color, and the other half of the area painted to provide a dark background of a neutral color indicated by the numeral 3. This background 3 may be black or a very dark gray or any other dark neutral color found suitable for use in this particular embodiment of the invention. Upon the background 2 there is painted, in this instance in red, the representation of a female in street attire, and upon the background 3 there is the representation 5 of a female in bathing attire, also painted in red. The numeral 6 indicates sources of red light rays which may be red electric light bulbs and which are so arranged with relation to the display surface 1 as a whole that the entire surface may be flooded with red light, and the numeral 7 indicates blue light bulbs or other sources of blue light rays which are likewise arranged so that the entire display surface may be flooded with blue, blue-green, or green light. In this embodiment we have the combination of a single pigment color and two complementary spectral colors. In the operation of the sign, and in accordance with the principles of color absorption, when the display surface is flooded with blue light, the image 5 will be obliterated and the entire area of the surface which bears the background 3 will appear substantially black, including, of course, the representation of the image 5. At this time, the image 4 will be visible and will appear substantially black on a substantially white background. On the other hand, when the display surface is flooded with red light, the image 4 will be obliterated as it is likewise painted in red, but the image 5 will appear against a black background and, due to the contrast between the dull black background and the illuminated image, the image will stand out vividly. It will be observed that in this application of the principles of the invention, both images are of the same color and while reference has been made to a representation of the images in red or orange, it will be understood that various other pigment colors may be employed, such for example as blue or green. For example, if the two images should be painted in emerald green or blue green, then, when the display surface is flooded with red light, the image 4 will appear substantially black against a substantially white background and the image 5 will be obliterated and, conversely, when the display surface is flooded by blue light rays, the image 4 will be obliterated and the image 5 will stand out vividly as in the preceding example. It will be understood, of course, that pigment colors other than the primary colors may be employed, the spectral colors with which the display surface is flooded being varied accordingly. It will be evident that in this adaptation of the principles of the invention, a sign displayed in accordance therewith will possess great value as a daylight sign inasmuch as the images are not overlapped but are entirely separated, and both the images will stand out prominently under white light. Thus, the specific example illustrated might be adopted by a dealer in ladies' apparel.

It will be evident from the foregoing that an image represented in one distinctive pigment color upon a light background will be entirely obliterated when displayed under spectral light rays of a corresponding color and that precisely the converse happens when an image represented in said color upon a dark neutral background is displayed under light rays of a corresponding color, for in this latter instance, the image will stand out vividly against a dark background.

It will be understood that the concrete example illustrated in Figure 1 of the drawings and above described, is merely offered as an exemplification of one practical embodiment of the principles of the invention in a signboard and that the invention is in no way limited to the particular color combinations referred to nor is it limited to any particular arrangement of the contrasting backgrounds 2 and 3, nor to the number of such backgrounds for various portions of the display surface might be painted to afford a background relatively light in tint and other portions may be painted to afford a background dark in color, without regard to the area covered by the backgrounds or the relative arrangement of the backgrounds, so that there are practically unlimited opportunities for an advertiser to display his skill in arranging advertising matter upon the display surface.

In the embodiment illustrated in Figure 2 of the drawings, the numeral 8 indicates in general the display surface on which there is painted a background 9 of a light neutral color and a background 10 of a dark neutral color. At this point, it may be stated that the extremes of neutral colors are white and black and that there are many color tints which may be employed for a light background and many dark tints which may be employed for a dark background, so that in none of the embodiments of the invention are the backgrounds restricted to any particular neutral color, the colors being selected in accordance with the pigment colors to be employed in representing the different images and the judgment of the one supervising the arrangement and painting of the advertising or other matter to be displayed. In the said Figure 2, and upon the background 9, there are represented, for example, two blocks standing approximately on end and indicated by the numeral 11, these blocks being represented in red, for example, and Figures 12 and 13 may likewise be represented upon the said background, in red, and the former apparently supporting the blocks and the latter standing upon the upper one of the blocks. Similar blocks 14 are represented in green upon the background 10, and Figures 15 and 16 similar to the Figures 12 and 13, are likewise represented in green upon this background. Red light bulbs 17 or any other source of red spectral light rays, and green, blue, or bluish green bulbs 18, or other sources of spectral rays of similar color, are so arranged with respect to the display surface that the surface may be successively flooded with the complementary or contrasting spectral colors. In this embodiment of the invention, when the display surface is flooded with red light, the images upon the background 9 will be obliterated as will also the images upon the background 10, but when the surface is flooded with blue light or blue green light, the images 11, 12 and 13 upon the background 9 will appear substantially black, and the images 14, 15 and 16 upon the background 10 will stand out substantially white, by contrast with the dark background. Thus, by successively flooding the display surface with spectral light rays of complementary or contrasting colors, the matter represented in pigment colors upon the surface will be caused to appear and disappear.

It will be understood, of course, that in the embodiment just described, the images 11, 12 and 13 upon the background 9 may be represented in green and the images 14, 15 and 16 upon the background 10 may be represented in red so that both sets of images will appear under the red light but both be obliterated under blue light.

In the embodiment shown in Figure 3 of the drawings, the display surface, which is indicated by the numeral 19, may have a neutral pigment applied thereto to provide a dark neutral background indicated by the numeral 20, and such pigment might be tobacco brown or Indian red, or any of the other dark neutral colors. In this instance, two figures, indicated by the numerals 21 and 22, may be painted upon the display surface, the one indicated by the numeral 21 being, for example, represented in red and the one indicated by the numeral 22 being represented in green. The two figures may, as an example, be representative of a clown in a jumping posture, although, of course, this disclosure is to merely illustrate the application of the principles of the invention. Red light bulbs 23, and blue light bulbs 24, or other sources of red and blue spectral light, are arranged so that the display surface may be flooded with red and blue light rays, alternately, and when the surface is flooded with red light rays, the image 21 will stand out vividly, but the image 22 will be obliterated. In like manner, when the surface is flooded by blue light rays, the image 22 will stand out vividly and the image 21 will be obliterated so that as the sources of light are alternately flashed on, the appearance will be that of the clown jumping from one side to the other of the display surface.

In the embodiment just described, the images are represented upon a dark neutral background, but it will be understood, without further illustration, that they might be represented upon a white background or a neutral background, in which event the image 21 would appear and the image 22 disappear under blue light rays, and the image 22 would appear and the image 21 disappear under red light rays, which is the converse of what takes place in the embodiment mentioned.

Figure 4:
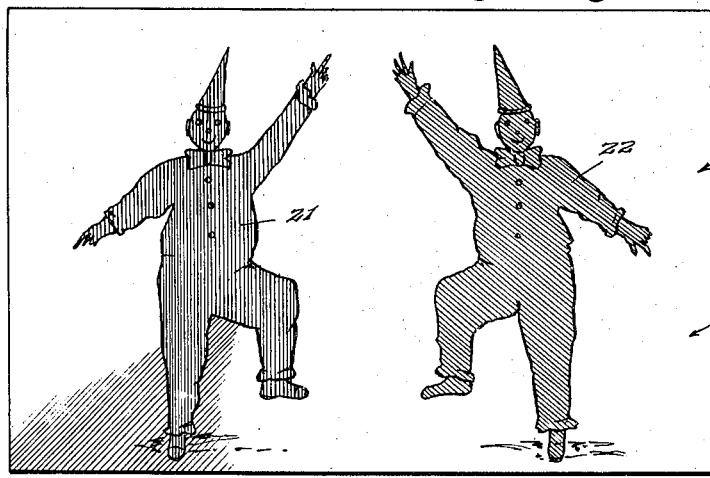
Figure 4 is a schematic view illustrating another application of the principles of the invention.
Figure 4:
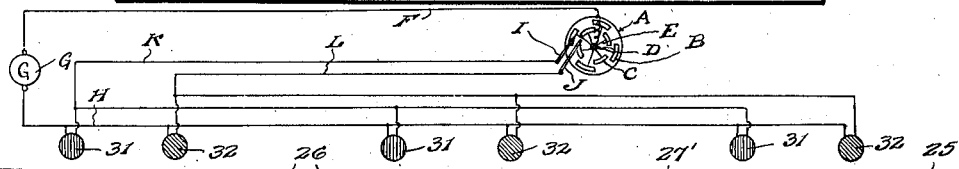
Figure 4:
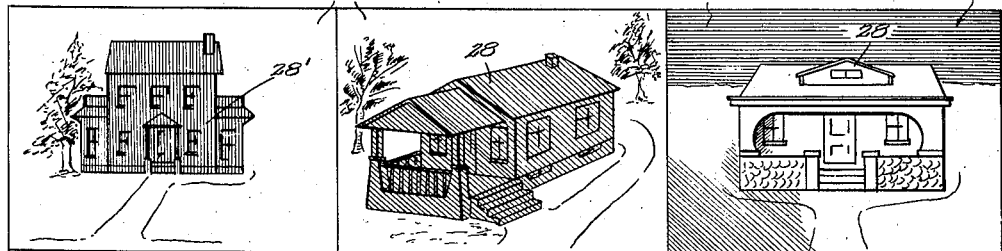
Figure 4:
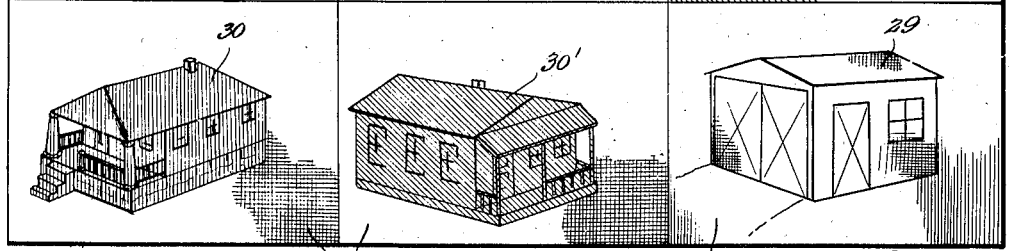

Figure 4 of the drawings illustrates the application of the principles of the invention to a display surface having a number of variously arranged neutral backgrounds and various images depicted thereon to be displayed under spectral rays of different colors, and this figure is intended to illustrate the fact that a display surface may, in accordance with the invention, be divided up into a number of variously arranged light and dark background areas so that many combinations of images or matters to be displayed may be readily effected. In the specific illustration, the numeral 25 indicates in general the display surface and the same may, for example, be in the nature of a sign board to advertise the business of a real estate agent or a contractor and builder. Certain of the background areas, indicated by the numeral 26, may be of a light neutral color; others, indicated by the numeral 27 may be of a dark neutral color, and others, indicated at 27', of distinctive pigment colors. various styles of houses, bungalows, and other building structures may be represented in the areas 26, as indicated by the numeral 28, in green pigment, the area 29 in a dark neutral color on a red background, and another, indicated by the numeral 28', may be represented by the use of a red pigment. The building structures represented in the spaces or areas 27 may be painted, one in red, as indicated by the numeral 30, and the other 30' in green. The numeral 31 indicates sources of red spectral light and the numeral 32 indicates sources of green spectral light. By reference to Figure 4, it will be understood that when the display surface is flooded with red light rays, the representations 28, 29 and 30 will appear and the representations 28' and 30' will be obliterated and, on the other hand, when the surface is flooded with green rays, the representations 28', 29 and 30' will alone appear and the representations 28 and 30 will be obliterated. While this figure, as well as Figures 1 and 2, previously described, represent a display surface divided by well defined lines of division into background areas of contrasting neutral colors, nevertheless, it is to be understood that in actual practice, the adjacent backgrounds might be blended or merged and be of a more or less irregular outline, depending, of course, upon the nature of the advertising matter or other matter to be displayed. It will be evident at this point that in this embodiment of the invention each of the areas constitutes in effect an individual display surface, different principles being employed in representing the matters to be displayed upon the several areas and that yet the entire display surface constitutes a composite of all of the areas and is alternately displayed under light rays having different color characteristics. It will be evident, therefore, that the various principles resorted to in arranging or depicting the display matter, in this embodiment, may be employed in the representation of more complex subjects, all displayed on a single surface.

Figure 5 of the drawings illustrates an embodiment in which the effect of motion is produced and in which the apparently moving parts are represented upon backgrounds of different colors. In this embodiment, the display surface is indicated by the numeral 33 and has dark neutral background areas 34 painted thereon and red background areas 35. The representation in this figure is that of a see-saw or a teeter-totter which, in one position of its movement is illustrated in plain white, as indicated by the numeral 36, the see-saw in this position being represented upon the red background 35. In its other position, the see-saw or teeter-totter is represented as at 37 in red upon the dark neutral backgrounds 34. The stand upon which the see-saw is supported for rocking movement is represented in white, as indicated by the numeral 38, and is located between two of the background areas 34 and 35, it being observed that the areas 34 are diagonally oppositely located and that the areas 35 are likewise diagonally oppositely located. Red light bulbs 39 and blue bulbs 40, or other equivalent sources of spectral colored light rays are so arranged with relation to the display surface that the same may be flooded with red rays or with blue rays, and it will be understood that when the surface is flooded with red light rays the image 36 will be obliterated but the image 37 will stand out substantially white against the background areas 34. When the surface is flooded with blue light rays, the image 37 will be obliterated and the image 36 will stand out substantially white against the then apparently black background 35. Under both conditions, the support or pedestal 38 will be visible. It will be understood, of course, that in this embodiment of the invention the backgrounds 35 might be green and the image 37 might likewise be green, in which event the image 37 would stand out under the blue light illumination of the display surface and the image 36 would stand out under the red light illumination of the surface.

Figure 6 of the drawings illustrates the adaptation of the principles of the invention to a display surface on which images are partially overlapped or superimposed and in this figure the display surface will preferably be painted to provide neutral areas 41 and 42 which will be, in the illustrated embodiment, respectively dark and light in color. As an example of this adaptation of the principles of the invention, one or more words comprising an advertisement, are painted upon the background areas, each letter of each word being represented in two shapes and sizes, and portions of the two representations of each letter being overlapped. Thus, for example, the letters of one word are painted upon the background 41 in red, for example, as indicated by the numeral 43, in one size and style of letter, and the corresponding letter in another size and style will be printed in green, as indicated by the numeral 44. The letters of another word are printed, for example, upon the background 42, in green, as indicated by the numeral 43', in one size and style of letter, and the corresponding letter in another size and style will be painted in red as indicated by the numeral 44'. Where any portions of the two letter representations 43 and 44 overlap, the overlapping portions, indicated by the numeral 45, will be represented in white, inasmuch as these letter representations are on a black or dark neutral background. In a like manner, where any portions of the letter representations 43' and 44' overlap, they will appear in black inasmuch as these letter representations are on a white or light neutral background. The numeral 46 indicates a source of red light rays and the numeral 47 a source of blue light rays. It will now be apparent that when the display surface is illuminated by the red light rays, the letter representations 44 will be obliterated and the letter representations 43 and the overlapped portions 45 will stand out vividly against a black or dark background. At this time, the letter representations 44', which are in red, will be obliterated as they appear on the white or light background area 42, and the letter representations 43' together with the overlapping portions 45' which latter are in black, will both appear black against the white background. On the other hand, when the display surface is flooded with blue light, the representations 43 will be obliterated and the representations 44 together with the overlapping portions 45, will stand out vividly against a black background and, at the same time, the representations 43' will be obliterated and the representations 44' and the black overlapping portions 45' will stand out substantially black against a white background. Thus, if the letter representations 43 are, as shown in the drawings, relatively short and broad, and the letter representations 44 are relatively tall and narrow, there will be an appearance of expansion and contraction of the letters as the board or other display surface is alternately flooded with red and blue light rays. This application of the principles of the invention is, of course, not limited to the display of letters, for various images might be arranged in more or less overlapped relation and similarly displayed. Furthermore, this application of the principles of the invention is not limited to the use of contrasting backgrounds, for light neutral or dark neutral backgrounds might be employed.

It will be evident that while reference has been made to the use of pigment colors in the representation of the images or other matter to be displayed, they may be represented by colored lithographic prints, dyes, opaque or transparent oil or water colors, etc., and the invention may be employed for advertising, theatrical, amusement, educational and other purposes.

In the several embodiments of the invention illustrated and described, the principles have been adapted primarily to advertising displays, but it will be understood that this is merely representative of one application of the principles of the invention and that the principles may be employed in color displays for any purposes whatsoever such for example as scenic effects, amusement displays, educational displays, walls, cabarets, etc.

It is, of course, essential to employ means for effecting illumination of the display surface, in each of the illustrated embodiments of the invention, which means will operate automatically, and inasmuch as there are many flashing devices which may be employed for this purpose, I have illustrated in connection with each figure a flasher indicated as a whole by the reference letter A, which may be a rotary disc of insulating material having concentric series of contact strips B and C upon its face in circuit with a shaft D which supports the disc for rotation, wires E serving to electrically connect the said contact strips and the shaft, and a conductor wire F being led from the shaft to one side of a source of current supply indicated by the numeral G. A conductor wire H leads from the other side of the source of current supply and is connected to the sockets for all of the electric light bulbs regardless of their distinctive colors. Brushes I and J are arranged to coact respectively with the contact strips B and C, and conductor wires K and L are led respectively from the brushes I and J and are connected, one with the other terminal of each socket for a light bulb of one color and the other with the other terminal of the socket for each light bulb of the other color. The contact strips B and C are arranged in staggered relation so that the circuit will be successively alternately closed through the bulbs of the two distinctive colors.

Having thus described the invention, what I claim is:

1. Display apparatus comprising a display surface having contracting background areas of neutral colors, matters to be displayed represented upon said areas in a distinctive pigment color, and means for displaying said surface successively in the presence of contrasting spectral colors one of which corresponds substantially to the pigment color in which the said matters to be displayed are represented 2. Display apparatus comprising a display surface having background areas of contrasting neutral colors, the areas bearing matters to be displayed and represented in distinctive contrasting pigment colors, and means for displaying said surface successively in the presence of contrasting spectral colors each of which corresponds substantially to a respective one of the pigment colors.

3. Display apparatus comprising a display surface having contrasting backgrounds of neutral colors, each background area bearing matter to be displayed, the matter appearing in one form on one area and in another form in another area and the said matter being represented in a single distinctive pigment color, and means for displaying said surface successively in the presence of contrasting spectral colors one of which corresponds substantially to the pigment color and the other of which is complimentary to the pigment color.

4. Means for displaying the effect of change in appearance of represented matters comprising a display surface having a background represented in neutral colors and having thereon the matters to be displayed represented in a pigment and which pigment representations have no spectral color difference, and means for displaying said surface successively in the presence of light rays having different color characteristics and one corresponding substantially to the pigment in which the matters are represented.

5. Means for displaying the effect of change in appearance of represented matters comprising a display surface having a background represented in neutral colors and having thereon the matters to be displayed represented in a pigment and which pigment representations have no spectral color difference, and means for displaying said surface directly to the eye successively in the presence of light rays flooding the entire surface and which rays have different color characteristics, one corresponding substantially to the pigment in which the matters are represented.

6. Means for displaying the effect of change in appearance of represented matters comprising a display surface having contrasting background areas of neutral colors, matters to be displayed represented upon said areas in a distinctive pigment color, and means for displaying said surface successively in the presence of light rays having different color characteristics.

7. Means for displaying the effect of change in appearance of represented matters comprising a display surface having a background represented in neutral colors and having thereon the matters to be displayed represented in a pigment and which pigment representations have no spectral color difference, and means for successively instantaneously flooding the display surface at non-coincident periods with light rays having different color characteristics.

8. Means for displaying the effect of change in appearance of represented matters comprising a display surface having a background represented in neutral colors and having thereon the matters to be displayed represented in a pigment and which pigment representations have no visible spectral color difference, and means for successively instantaneously flooding the display surface at non-coincident periods with light rays having different color characteristics and one corresponding substantially to the pigment in which the matters are represented.

9. Means for displaying the effect of change in appearance of represented matters comprising a display surface having a background represented in contrasting neutral colors, and having thereon the matters to be displayed represented in pigment and which matter representations have no visible spectral difference, and means for displaying said surface at successive periods under light rays of a character to obliterate one representation and render the other representation visible.

10. Display apparatus comprising a display surface having thereon, upon contrasting neutral backgrounds, pigment representations of matters to be displayed and which representations are of a distinctive color, and means for displaying said surface selectively in the presence of light rays having different color characteristics such as to obliterate one representation and render the other representation visible.

11. Means for displaying the effect of animation of separated images comprising a display surface having a background represented in contrasting neutral colors and having thereon the matters to be displayed represented in a single distinctive pigment color, and means for displaying said surface at successive periods under light rays of a character to obliterate one representation and render the other representation visible.

In testimony whereof I affix my signature.

RICHARD M. CRAIG. [L. S.]